May 27, 1941.  E. ARON  2,243,183
COMBINED VEHICLE LIFTING AND ROCKING DEVICE
Filed April 27, 1939  2 Sheets-Sheet 1
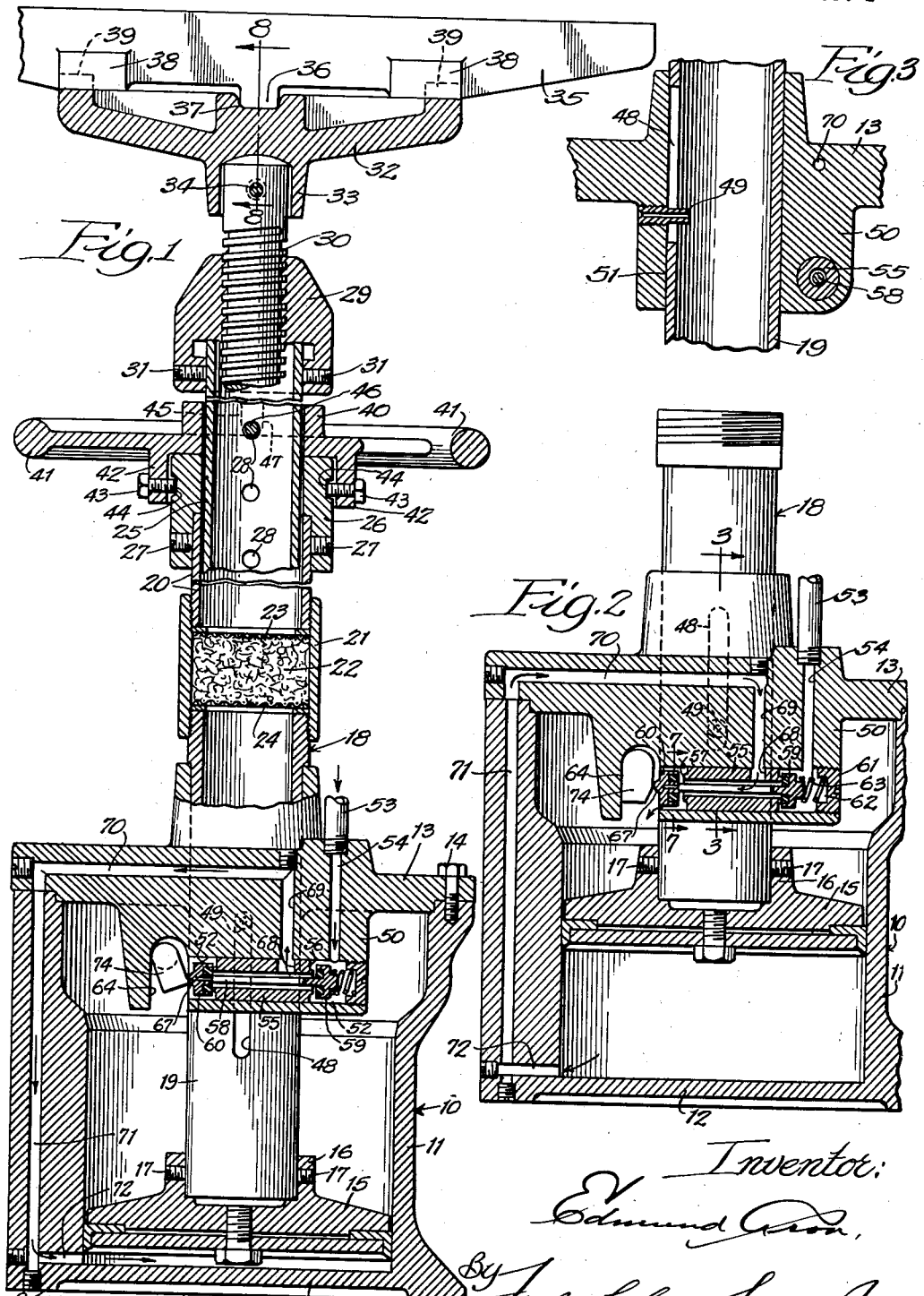

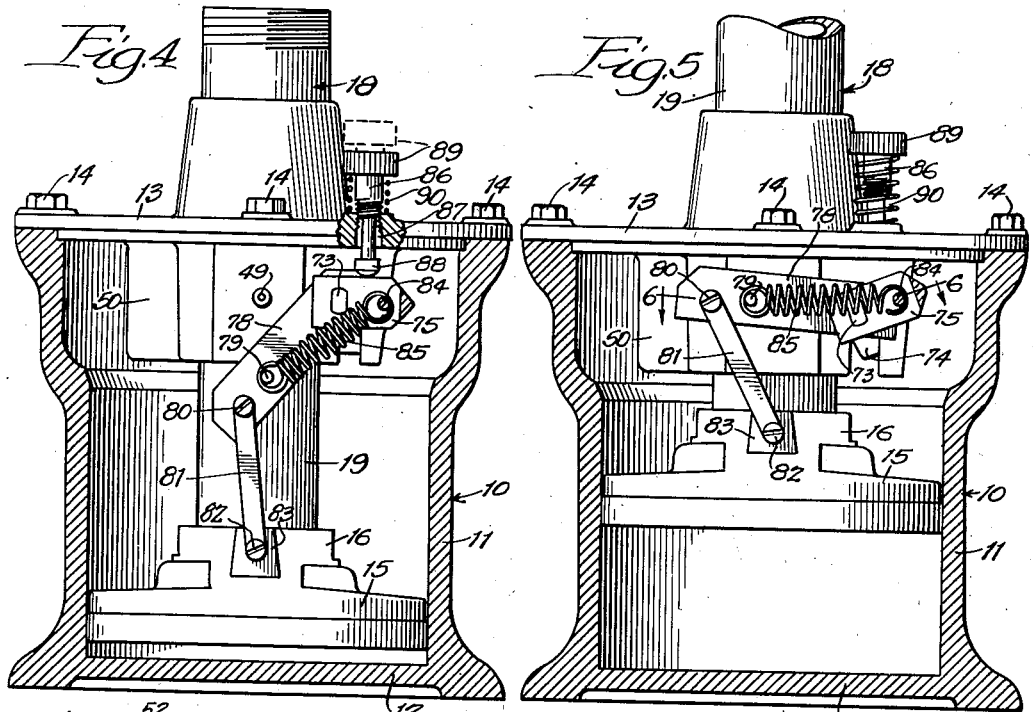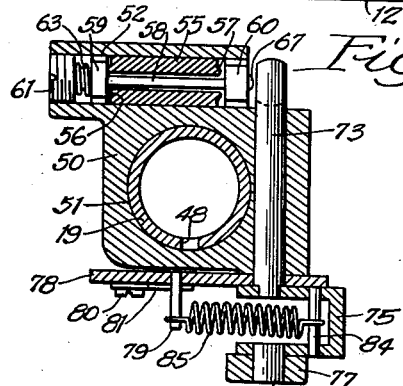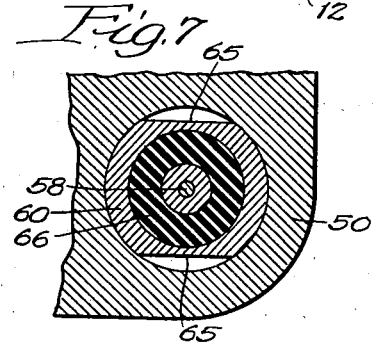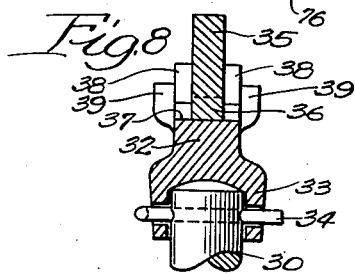

Patented May 27, 1941

2,243,183

UNITED STATES PATENT OFFICE 2,243,183

COMBINED VEHICLE LIFTING AND ROCKING DEVICE

Edmund Aron, Chicago, Ill., assignor to Moto-Sway Corporation of America, Chicago, Ill., a corporation of Illinois Application April 27, 1939, Serial No. 270,382

6 Claims. (Cl. 121—164)

This invention relates to devices extensively used to facilitate the greasing and oiling of certan parts of vehicles, such as leaf springs, shacklebolts, and other movable joints that require occasional lubrication to prevent squeaking and undue wear. A known class of such devices employs a pneumatic motor of the expansible chamber type, such as a cylinder and piston, the piston rod or stem carrying a head in or on which is mounted a saddle to liftingly engage beneath a spring, shacklebolt, or other jointed part of the vehicle. The head is usually manually adjustable up and down on the piston rod or stem so as to preliminarily fit it to the part to be raised, and the cylinder of the motor is formed with suitable passages and ports for the admission and exhaust of motive fluid—usually compressed air, and with a distributing valve controlling the inlet and exhaust of motive fluid to and from the cylinder space beneath the piston; the space above the piston being vented to atmosphere to provide for the free inflow of atmospheric air above the piston when the latter descends and its free discharge when the piston rises. The distributing valve is usually actuated by a moving part of the motor, such as the piston; and to secure a quick shift of the valve between its two positions spring actuated over-the-center toggles, for effecting a snap actuation of the valve at a predetermined point of the piston in the cylinder, have been used.

In practice, two such devices are sometimes used located beneath the respective sides of an automobile and controlled as to their relative movements by a master valve which effects alternate movements of the lifts, so as to impart a sidewise rocking movement to the vehicle, and in another manner of use a single device is placed beneath one side of a chassis frame to vibrate the latter vertically so as to open and close the leaves of an elliptic or semi-elliptic spring to facilitate the greasing or oiling of the latter.

The general object of this invention is to provide an improved device of this character in the directions of greater simplicity of structure, lower cost of manufacture, and higher efficiency and reliability in use. Other more specific objects are, to provide an improved and simplified automatic vibrating mechanism, including the distributing valve and its operating means, and to provide an attachment by which the device can function solely as a lift.

An illustrative embodiment of the invention is shown in the accompanying drawings, in which—

Fig. 1 is a vertical axial section of the motor cylinder, piston, extensible piston rod, and head of the device, with the piston rod broken and the saddle in side elevation, showing the piston at its lowest position, and the distributing valve in a position to admit motive fluid beneath the piston.

Fig. 2 is a similar view of the lower portion of Fig. 1, showing the piston in a position wherein it has just started on its downward movement, and the distributing valve shifted to a position to pass the expanded motive fluid from the space beneath the piston to the space above the latter.

Fig. 3 is a fragmentary vertical section on the line 3—3 of Fig. 2.

Figs. 4 and 5 are side elevations, in vertical section through the body and bottom wall of the cylinder, showing two positions of the valve-actuating toggle, Fig. 4 corresponding to the position of the distributing valve shown in Fig. 1, and Fig. 5 corresponding to the valve position shown in Fig. 2; Fig. 4 also showing the manually operated toggle lock set to working position.

Fig. 6 is a horizontal section through the distributing valve and a part of its actuating mechanism on the line 6—6 of Fig. 5.

Fig. 7 is an enlarged vertical section through one valve-head of the distributing valve and its bearing on the line 7—7 of Fig. 2.

Fig. 8 is a vertical section on the line 8—8 of Fig. 1.

In the drawings 10 designates as an entirety the motor cylinder, comprising a cylinder body 11, a lower head 12 integral with the body, and a removable upper head or cap 13 secured to the body 11 by cap screws 14. Reciprocable within the cylinder is the piston 15 formed with a hollow boss 16 on its upper side, in which is secured by set screws 17 the lower end of a tubular piston rod designated as an entirety by 18. This piston rod comprises a lower section 19, an intermediate section 20 connected to the upper end of the section 19 by a sleeve 21 which has threaded engagement with the upper end of section 19 and with the lower end of section 20, and contains a body of mineral wool or other fibrous material 22 that is confined between upper and lower screens 23 and 24 and serves as a muffler, and an upper tubular section 25 that telescopes within the intermediate section 20. A collar 26 encircles the upper section 25, and the lower half of this collar is counterbored to encircle the upper end of the intermediate section 20 and is secured to the latter by set screws 27. In the upper section 25 are vertically spaced holes 28, the double function of which is later described.

Secured on the upper end of the upper section 25 is a nut 29 engaged with a threaded rod 30 that extends some distance into the upper end of the section 25. Nut 29 is nonrotatably secured to section 25 by set screws 31. A head 32 has on its lower side a socketed lug 33 which fits over the upper end of screw 30 and is secured to the latter by a cross pin 34. A saddle 35 is removably mounted on the head 32, the saddle having a central depending lug 36 fitting into a central socket 37 in the head 32, and lateral lugs 38 on each side thereof that are straddled by upstanding lugs 39 on the ends of the head 32.

Encircling the upper tubular rod section 25 is the hub 40 of a hand wheel 41, said hub being formed with a depending integral annular flange 42 carrying cap screws 43, the inner ends of which enter an annular groove 44 in the collar 26, to lock the hand wheel 41 against vertical displacement from the collar while permitting it to turn relatively to the collar. In the hub 40 of the hand wheel is a pair of oppositely disposed vertical slots 45 through which and one of the holes 28 is inserted a locking pin 46 formed with a bent end 47 to facilitate its application and removal. This pin 46 locks the hand wheel to the upper tubular rod section 25, and since the nut 29 is nonrotatably mounted on the upper end of rod section 25, and the upper end of screw 30 is nonrotatably engaged with the head 32, rotation of the hand wheel 41 raises or lowers the head and saddle. This is to obtain a final fine adjustment of the saddle with the vehicle spring or other part engaged thereby. A preliminary course adjustment is readily effected by withdrawing pin 46, grasping the nut 29 and bodily raising or lowering the rod section 25 until another hole 28 registers with the slots 45, and then reinserting the pin 46. In the lower tubular rod section 19 is a vertical slot 48, through which extends a nipple 49 that assists in venting air from the space above the piston when the latter rises, as will be hereinafter described.

Describing now the means for effecting automatic reciprocations of the piston 15, on the underside of the upper head or cap 13 of the motor cylinder is an integral depending block 50 that, as shown in Fig. 6, has a vertical bore 51 for the passage therethrough of the lower rod section 19. At one side of the bore 51 is a horizontal bore 52 that forms a valve chamber for a distributing valve. Motive fluid such as compressed air, is admitted from a pipe or hose 53 (Fig. 1) to valve chamber 52 through a vertical passageway 54 that communicates at its lower end with the valve chamber. Tightly fitted in the valve chamber 52 is a tubular block 55 formed on its ends with annular valve seats 56, 57. Extending through the bore of the block 55 is a valve spindle 58 of less diameter than the diameter of the bore so as to form an annular airflow passage. On one end of the spindle 58 is a valve 59 that cooperates with the valve seat 56, and on the other end of the spindle 58 is a similar valve 60 that cooperates with the valve seat 57. The length of the spindle 58 is such that when either valve is seated the other is unseated. One end of the valve chamber 52 is closed by a plug 61, which has a countersunk seat 62 for the outer end of a thrust spring 63 that urges the valve 59 to closed position, as shown in Fig. 2. The other end of the valve chamber 52 opens into a vertical slot 64 in and opening through the lower end of the block 50. The valve 60 on the other end of the spindle 58 is slidable in the valve chamber, but, as shown in Fig. 7, the periphery of the valve body is flattened at opposite points, as indicated at 65 so that, when the valve 60 is unseated as shown in Fig. 2, air can flow past the valve into the slot 64 and through the open end of the latter into the cylinder space above the piston. Each of the valves 59 and 60 is equipped on its inner face with a packing, such as 66 (Fig. 7) cooperating with its associated valve seat. On the outer end of valve 60 is a nib 67 that cooperates with a tappet, later described, to seat the valve 60 and unseat the valve 59.

In the tubular block 55 is a port 68 that communicates with the lower end of a vertical passageway 69 in the cylinder head 13 and block 50, the upper end of passageway 69 communicating with a horizontal passageway 70 in the head 13. The other end of passageway 70 communicates with the upper end of a vertical passageway 71 in the wall of the cylinder body, and the lower end of passageway 71 communicates with a short horizontal passageway 72 that leads into the cylinder space below the piston 15. As will appear later, this continuous passageway 68, 69, 70, 71 and 72 has the double function of admitting motive fluid to the space beneath the piston, as shown in Fig. 1, and of later, on the descent of the piston, exhausting the expanded fluid in the reverse direction into the cylinder space above the piston, as shown in Fig. 2. As the piston begins its rising movement from the position shown in Fig. 1, the body of air previously charged into the space above the piston is vented to atmosphere, at first directly through the lower portion of slot 48, thence upwardly through the hollow piston rod, and out through the holes 28. As soon as the lower end of slot 48 passes the piston rod bearing in head 13 and block 50, as shown in Fig. 3, the exhaust to the interior of the piston rod takes place through the nipple 49.

During each rising and each descending movement of the piston, the distributing valve is shifted, so as to admit pressure fluid beneath the piston when the latter has reached its lowest position, and to discharge the expanded fluid from beneath the piston when the latter starts to descend.

Describing next the mechanism for shifting the distributing valve from the position shown in Fig. 2 to that shown in Fig. 1, and referring to Figs. 1, 2, 4, 5 and 6, 73 designates a horizontal rock shaft mounted in the block 50 and having on one end thereof a depending tappet 74 adapted to engage the nib 67 of valve 60 and shift the valve assembly from the Fig. 2 position to the Fig. 1 position. Fast on the other end of rock shaft 73 is one limb of a U-shaped arm 75, the other limb of which is pivoted on a stub shaft 76 (Fig. 6) mounted in a depending lug 77 on block 50. Pivoted on rock shaft 73 is a toggle link 78 carrying a pin 79, and pivoted at 80 on the outer end of link 78 is a second toggle link 81 that is pivoted at its lower end at 82 to a flattened surface 83 on the piston boss 16. Mounted in and between the parallel limbs of the arms 75 is a pin 84, anchored to which is a pull spring 85, the other end of said spring being anchored to the pin 79.

Describing the operation, let it be assumed that the piston is at the bottom of its down stroke. At this time the distributing valve is in a position to admit the motive fluid past valve head 59, as shown in Fig. 1, and the snap actuator of the valve is in the expanded position shown in Fig. 4. As the piston rises, the motive fluid continues to flow into the space beneath the piston until the toggle links have collapsed sufficiently to carry the spring 85 upwardly across the axis of rock shaft 73, as shown in Fig. 5. As the spring crosses the axis, the arm 75 is quickly rocked from the position shown in Fig. 4 to that shown in Fig. 5, and this swings the tappet 74 away from the distributing valve, allowing spring 63 to close valve 59 and open valve 60. This cuts off the flow of motive fluid beneath the piston, and thence the expanded fluid beneath the piston flows into the cylinder space above the piston, permitting the piston to descend. When, during the descent of the piston, the toggle links have expanded sufficiently to carry the spring 85 across the axis of the rock shaft, the spring 85, through the arm 75, instantly rocks the shaft 73 in the reverse direction, causing the tappet 74 to shift the distributing valve back to the position shown in Fig. 1, closing the valve 60 and opening the valve 59. Thereupon the motive fluid again enters the space beneath the piston, and the described cycle is repeated. The reciprocations of the piston are rapid, and this sets up a rapid vibration of the saddle 35 and the part of the vehicle engaged by the latter.

In oiling or greasing the parts of the vehicle served by this device, it is customary first to raise the part to be served and maintain it in raised position until grease or oil has been injected, and then set in action the vibrating mechanism to thoroughly distribute the grease or oil between the contacting surfaces. To facilitate this mode of service, I have provided a simple manually operated device by which, after the piston has been raised, the snap actuator is prevented from shifting the distributing valve, so that the motive fluid is trapped beneath the piston. As herein shown, this device consists of a vertical rod 86 (Figs. 4 and 5) screw threaded into a tapped hole 87 in the cylinder cap 13, said rod having on its lower end a head 88 overlying the upper edge of one of the limbs of the arm 75 and on its upper end a knurled knob 89 by which the head 88 can be shifted from its working position shown in Fig. 4 to an idle position within the lower portion of hole 87 wherein it is free from interference with the movement of the arm 75. A thrust spring 90 between the head 89 and the top of the cylinder cap 13 normally urges the stop device to idle position as shown in Fig. 5. When the lock is engaged with the arm 75, as shown in Fig. 4, and the piston rises, the valve actuator is rendered ineffective to shift the valve to the Fig. 2 position, and the piston remains elevated until the stop is retracted, whereupon the arm 75 is free to swing to the Fig. 5 position, thus shifting the distributing valve, and venting the expanded air from beneath the piston.

The muffler 22 in the hollow piston rod, lying across the path of the escaping air, is, of course, not essential, but is preferably employed to obviate the hissing noise of the escaping air that, without the muffler, is quite pronounced.

I have herein shown and described an embodiment of the invention that, in practice, has been found to satisfactorily effectuate the stated purposes and objects thereof; but obviously detailed changes in structure and arrangement of the co-operating parts may be resorted to without sacrificing any of the advantages of the invention, and hence I do not limit the latter to the specific form herein presented except to the extent clearly indicated in specific claims.

I claim:

1. In an automatic vibrating mechanism, a vertically arranged cylinder, a piston reciprocable within said cylinder, a piston rod extending through the upper head of the cylinder, said cylinder having a valve chamber and a single passageway in the walls thereof in constant communication at one end with the cylinder space beneath the piston and at its other end with said valve chamber, a reciprocatory distributing valve in said valve chamber, said valve operating to alternately admit motive fluid through said passageway to the cylinder space beneath the piston and discharge the same thence through said passageway into the cylinder space above the piston, a spring urging said valve in one direction, means operative to shift the valve in the other direction against the urge of said spring, and means operative by virtue of piston reciprocation controlling the operation of said last named means.

2. In an automatic vibrating mechanism, a vertically arranged cylinder, a piston reciprocable within said cylinder, a piston rod extending through the upper head of the cylinder, said cylinder having a valve chamber and a single passageway in the walls thereof in constant communication at one end with the cylinder space beneath the piston and at its other end with said valve chamber, a reciprocatory distributing valve in said valve chamber, said valve operating to alternately admit motive fluid through said passageway to the cylinder space beneath the piston and discharge the same thence through said passageway into the cylinder space above the piston, a spring urging said valve in one direction, a rock shaft and a tappet thereon operative to shift the valve in the other direction against the urge of said spring, and a toggle type snap actuator operated by the piston during its rising and descending movements for rocking said shaft, said snap actuator comprising a toggle link pivoted at one end on the rock shaft, a second toggle link pivoted at its upper end to the other end of said first named toggle link and at its lower end to the piston, an arm fast on said rock shaft, and a pull spring anchored at one end to said arm and at its other end to said first named toggle link, said spring being bodily movable across the axis of said rock shafts, as the toggle links collapse and expand during the rising and descending movements of the piston.

3. In an automatic vibrating mechanism, a vertically arranged cylinder, a piston reciprocable within said cylinder, a piston rod extending through the upper head of the cylinder, said cylinder having a valve chamber and a single passageway in the walls thereof in constant communication at one end with the cylinder space beneath the piston and at its other end with said valve chamber, a reciprocatory distributing valve in said valve chamber, said valve operating to alternately admit motive fluid through said passageway to the cylinder space beneath the piston and discharge the same thence through said passageway into the cylinder space above the piston, a spring urging said valve in one direction, a rock shaft and a tappet thereon operative to shift the valve in the other direction against the urge of said spring, a toggle type snap actuator operated by the piston during its rising and descending movements for rocking said rock shaft, said snap actuator comprising a toggle link pivoted at one end on said rock shaft, a second toggle link pivoted at its upper end to the other end of said first named toggle link and at its lower end to the piston, an arm fast on said rock shaft, and a pull spring anchored at one end to said arm and at its other end to said first named toggle link, said last named spring being bodily movable across the axis of said rock shaft as the toggle links collapse and expand, and a manually operable stop shiftable into and out of the path of swing of said arm, whereby to prevent full actuation of said snap actuator to thereby trap motive fluid beneath the raised piston and arrest reciprocation of the latter.

4. A specific embodiment of the subject-matter defined in claim 1, wherein the reciprocatory distributing valve comprises a valve chamber, a tubular block in said chamber having an axial bore, a port communicating with said bore and with the single passageway in the walls of the cylinder, and valve seats on its ends, a valve spindle of less diameter than said bore extending through the latter, and valves on the ends of said spindle cooperating with said valve seats, said valve spindle being of greater length than said bore whereby when either valve is seated the other is unseated.

5. A specific embodiment of the subject-matter defined in claim 1, wherein the piston rod is hollow, and the cylinder space above the piston is continuously vented to atmosphere through said piston rod.

6. A specific embodiment of the subject-matter defined in claim 1, wherein the piston rod is hollow and equipped with a muffler, and the cylinder space above the piston is continuously vented to atmosphere through said piston rod and muffler.

EDMUND ARON.